United States Patent
Gowda

(10) Patent No.: US 11,627,377 B2
(45) Date of Patent: Apr. 11, 2023

(54) SET-TOP BOX AMBIANCE AND NOTIFICATION CONTROLLER

(71) Applicant: ARRIS Enterprises LLC, Suwanee, GA (US)

(72) Inventor: Sunil Kumar Puttaswamy Gowda, Karnataka (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/459,336

(22) Filed: Aug. 27, 2021

(65) Prior Publication Data

US 2022/0116684 A1 Apr. 14, 2022

Related U.S. Application Data

(60) Provisional application No. 63/090,328, filed on Oct. 12, 2020.

(51) Int. Cl.
*H04N 21/466* (2011.01)
*H04N 21/41* (2011.01)
*H04N 21/472* (2011.01)

(52) U.S. Cl.
CPC ..... *H04N 21/4662* (2013.01); *H04N 21/4131* (2013.01); *H04N 21/472* (2013.01)

(58) Field of Classification Search
None
See application file for complete search history.

(56) References Cited

U.S. PATENT DOCUMENTS 10,416,615 B2 * 9/2019 Lentzitzky ............. G05B 11/32
10,462,878 B2 * 10/2019 Wang ............... H04N 21/44204
(Continued)

FOREIGN PATENT DOCUMENTS

CN 108476258 A * 8/2018 ........... G06F 3/0482
JP 2006345486 A * 12/2006 ......... H04N 21/4131
(Continued)

OTHER PUBLICATIONS

Notification of Transmittal of the International Search Report (Forms PCT/ISA/220 and PCT/ISA/210) and the Written Dpinion of the International Searching Authority (Form PCT/ISA/237) dated Dec. 16, 2021, by the International Application Division Korean Intellectual Property Office in corresponding International Application No. PCT/US2021/047955. (9 pages).

*Primary Examiner* — William J Kim

(74) *Attorney, Agent, or Firm* — Panitch Schwarze Belisario & Nadel LLC

(57) ABSTRACT

Exemplary embodiments are directed to a device and method for controlling ambiance based on user-requested content. The device receives training data, user content requests, and user network device modification data. The device ascertains a content type for a user content request, performs analytics on the training data to create a model to predict ambiance settings, predicts ambiance settings for the content type using the model, evaluates the accuracy of the model and performs optimizations to the model to improve the predictions of the ambiance settings. The device controls the operating settings of one or more network devices based on the predicted ambiance settings. Moreover, exemplary embodiments are directed to controlling the enabling of display notifications, controlling reminder notifications, and controlling greeting notifications using a face identifier and notification settings.

18 Claims, 9 Drawing Sheets

(56) References Cited

U.S. PATENT DOCUMENTS

| | | | |
|---|---|---|---|
| 10,771,835 B1* | 9/2020 | Chong | H04N 21/43615 |
| 2002/0129367 A1* | 9/2002 | Devara | H04N 21/4622 |
| | | | 725/47 |
| 2005/0097618 A1* | 5/2005 | Arling | H04N 21/6125 |
| | | | 725/100 |
| 2005/0144638 A1* | 6/2005 | Allison | H04N 21/4622 |
| | | | 725/40 |
| 2007/0032198 A1* | 2/2007 | Sakamoto | H04L 65/80 |
| | | | 455/69 |
| 2009/0021474 A1* | 1/2009 | Bentley | H04N 7/17318 |
| | | | 345/156 |
| 2009/0110373 A1* | 4/2009 | Aoyagi | H04N 5/60 |
| | | | 386/353 |
| 2009/0268960 A1* | 10/2009 | Imai | H04N 5/57 |
| | | | 348/739 |
| 2014/0245352 A1* | 8/2014 | Tseng | G06F 16/438 |
| | | | 725/50 |
| 2016/0071549 A1* | 3/2016 | von Sneidern | H04N 21/8549 |
| | | | 386/241 |
| 2018/0184152 A1* | 6/2018 | Kirkpatrick | H04N 21/43637 |
| 2018/0367843 A1 | 12/2018 | Han | |
| 2019/0069375 A1* | 2/2019 | Baker | H04N 21/43635 |
| 2019/0116646 A1* | 4/2019 | Wang | A47H 5/14 |
| 2019/0166674 A1* | 5/2019 | Mason | H04N 21/8133 |
| 2019/0268661 A1 | 8/2019 | Park et al. | |
| 2020/0027364 A1 | 1/2020 | Singh et al. | |

FOREIGN PATENT DOCUMENTS

| | | | | |
|---|---|---|---|---|
| KR | 2007027803 A | * | 3/2007 | |
| KR | 10-2020-0114898 A | | 10/2020 | |
| WO | WO-0241634 A2 | * | 5/2002 | G06F 16/739 |
| WO | 2007/119277 A1 | | 10/2007 | |
| WO | WO-2010087155 A1 | * | 8/2010 | H04N 21/4131 |
| WO | WO-2017174582 A1 | * | 10/2017 | H04N 21/4131 |

* cited by examiner

SET-TOP BOX AMBIANCE AND NOTIFICATION CONTROLLER

TECHNICAL FIELD

The present disclosure is related to control of ambiance and notifications, and particularly to the control of ambiance and notifications by a set-top box or other similar device.

BACKGROUND

The Internet of Things (IoT) refers to devices acquiring connectivity, sensing abilities and computing power. Connected home technology devices, such as, thermostats, lighting, sound, and vending, are a category of IoT devices. These devices may be connected to a home network (e.g., multimedia over coax alliance (MoCA) network) and may communicate over the home network with each other and with other devices that are connected to the home network. Other devices that may be connected to the home network include multimedia devices, such as, a set-top box, a television, a mobile device, a tablet, etc.

One advantage of using IoT devices in a home network is the ability to make home life easier by assisting people in their routines through automation. To such an extent, the connected home technology devices may be controlled to create an ideal ambiance for a room to provide an enhanced experience for user(s) while viewing particular content programs.

Moreover, notifications such as, audio messages, content reminders and mobile notifications, may also be an effective way to provide an enhanced experience for users. The notifications may provide personalized greetings, reminders and alerts to the user. As such, it is desirable to provide a method and system for integrating connected home technology devices to control ambiance and to provide notifications to users.

SUMMARY

An exemplary method for controlling ambiance based on user-requested content is disclosed, the method comprising: receiving, from a content server, electronic program guide data over a first network; receiving, from an IoT server, training data over the first network; receiving, from a user input device, a user content request over a second network; ascertain a content type for the content request using the electronic program guide data; performing analytics on the received training data using at least one machine learning algorithm to create a model to predict ambiance settings; predicting ambiance settings for the content type using the model; evaluating accuracy of the model based on user network device modification data; performing optimizations to the model depending upon the evaluated accuracy to improve the predictions of the ambiance settings; and controlling operating settings of one or more network devices based on the predicted ambiance settings.

An exemplary device for controlling ambiance based on user-requested content is disclosed, the device comprising: a first network interface configured to receive electronic program guide data and training data; a second network interface configured to receive a user content request; memory configured to store electronic program guide data and computer executable instructions; an ambiance machine learning module including at least one processor configured to execute computer executable instructions to: perform analytics on the received training data using at least one machine learning algorithm to create a model to predict ambiance settings; predict ambiance settings for a content type using the model; evaluate accuracy of the model based on one or more user network device modified settings; perform optimizations to the model depending upon the evaluated accuracy to improve the predictions of the ambiance settings; and a network device controller configured to ascertain a content type for the content request using the electronic program guide data and to control operating settings of one or more network devices based on the predicted ambiance settings.

DETAILED DESCRIPTION

Exemplary embodiments of the present disclosure provide a manner of controlling ambiance based on user-requested content using computer premise equipment such as a multimedia device of set-top box. The set-top box can receive user requested video content and electronic programming guide data from one or more servers of a content provider. Moreover, the set-top box can receive data from one or more internet of things (IoT) servers to aid in the control of one or more IoT devices (i.e., network devices) in an IoT ambiance platform. The set-top box is configured to control the one or more IoT devices to control the ambiance (e.g., the ambiance of a room) when a user makes a requests to view content (e.g., video content programs).

Figure 1:
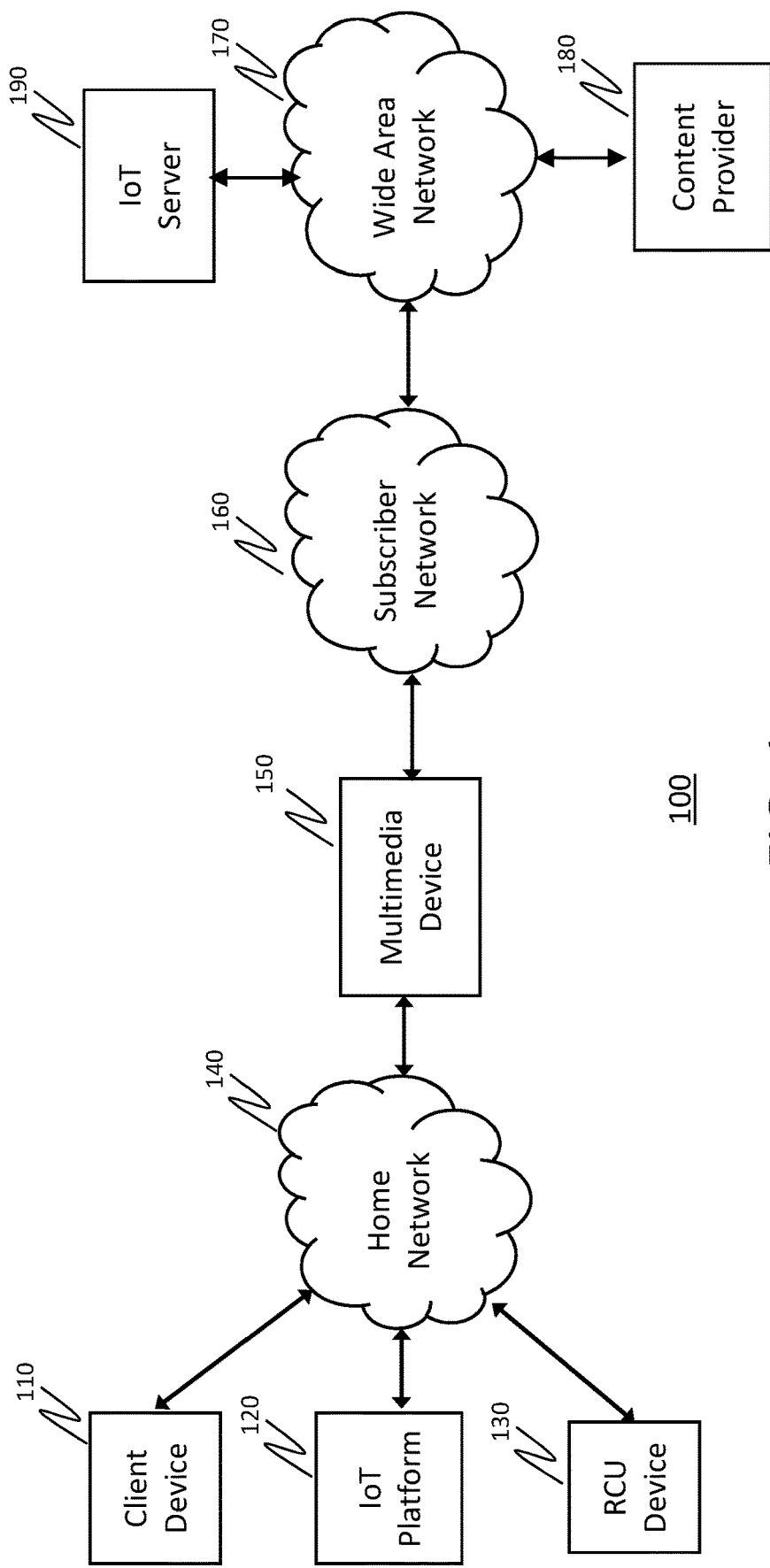
FIG. 1 is a block diagram illustrating an example network environment operable to facilitate the control of ambiance based on user-requested content in accordance with an exemplary embodiment of the present disclosure.

FIG. 1 is a block diagram illustrating an example network environment 100 operable to facilitate the control of ambiance based on user-requested content, the control of enabling display notifications, the control of reminder notifications, and the control of greeting notifications in accordance with exemplary embodiments of the present disclosure. The network environment 100 can include one or more client devices 110, an internet of things (IoT) ambiance platform 120, a remote control unit 130 (i.e., a user input device), a home network 140, one or more multimedia devices 150, a subscriber network 150, a wide area network (WAN) 170, a content provider 180, and an internet of things (IoT) server 190.

Client devices 110 may include a television, mobile device, tablet, computer, gaming device, a multimedia device (e.g., other set-top boxes) and any other device operable to receive video, voice, and/or data services. In embodiments, various services may be delivered to the client devices 110, including but not limited to, live or broadcast television, video-on-demand (VoD) content, pay-per view content, recorded content (e.g., DVR content), audio-only content, streaming content such as YouTube or Netflix content, and other various video, data, and/or voice services.

The IoT ambiance platform 120 includes a plurality of IoT devices (i.e., network devices) which may be used to control the ambiance of a room. The IoT devices may include lighting devices, thermostats/climate control, sound system/speaker, a content display IoT device (e.g., smart tv), vending device (e.g., coffee maker or popcorn maker). The IoT devices may be capable of interacting and communicating with each other and/or with other devices (e.g., multimedia device 150) connected to the home network 140 over various wireless communication standards (e.g., Wi-Fi, Zigbee, Bluetooth, etc.) or wired communication standards (e.g., Ethernet, Multimedia over Coax Alliance (MoCA), etc.).

Each IoT device includes a user IoT interface (e.g., a web app, mobile app, remote control, display screen integrated within the device itself, voice activation interface, a display provided from the multimedia device/set-top box presenting a user with command/control options for the device), one or more sensors and/or actuators, a network interface, and at least one embedded microcontroller. The user IoT interface allows a user to interact with a corresponding IoT device to control operations of the device (e.g., turn on, turn off) and make operating setting selections for the device.

Each IoT device may include one or more operating settings which may be controlled by a user and/or multimedia device 150 to create a user preferred ambiance. For example, a light IoT device may include settings for brightness, dimming, color change, ambient light effects, etc. A thermostat/climate control IoT device may include settings, such as, for example, temperature settings for heating, temperature settings for air conditioning, humidity, air flow, etc. A sound IoT device may include settings, such as, for example, surround sound, volume control, etc. A content display IoT device may include settings, such as, for example, display picture mode (e.g., cinema/movie), display picture size/sharpness, color, brightness, etc. A vending IoT device (e.g., coffee maker and/or popcorn maker) may include settings, such as, for example, start coffee maker, selection of coffee or expresso, selection of container size, start popcorn maker, popcorn container size, etc.

Each IoT device is capable of collecting data (e.g., user operating setting selections) over a period of time. The collected data may be time-stamped and stored in a cloud server (e.g., IoT server 190) for further processing. Further, multimedia device 150 may collect data (e.g., user-content requests), which may be time-stamped and stored in IoT server 190. The collected data may be analyzed to aid in understanding user needs and preferences. This understanding in user needs and preferences facilitates the provision of automated control of the IoT ambiance platform 120. The multimedia device 150 is configured to control the operations of the IoT ambiance platform, and in doing so, the multimedia device may perform analytics on the collected data and creates a prediction model to automate control of the IoT ambiance platform 120. The time-stamping of the collected data allows for the correlation of data collected from the IoT devices and the data collected from the multimedia device 150.

The remote control unit (RCU) 130 is a user input device which allows a user to make requests for content. For example, a user may initiate a request for content by activating one or a combination of buttons or keys of the remote control unit (RCU) 130. The RCU 130 may generate a wireless signal via any suitable wireless protocol such as Bluetooth, infrared radio frequency (RF), or any other type of signal as desired. It should be understood that RCU 130 may also generate other types of requests/commands to multimedia device 150.

The client device 110, IoT ambiance platform 120 and remote control unit 130 communicate with multimedia device 150 over a home network 140. The home network may include a local area network (LAN), a wireless local area network (WLAN), and/or a multimedia over coax alliance (MoCA) network.

According to an exemplary embodiment, the multimedia device 150 may include one or more access points (e.g., gateway device, modem device, or combination thereof), set-top boxes, and digital living network alliance (DLNA) multimedia devices. The multimedia device 150 provides multimedia content (e.g., video, data and/or voice services) to one or more client devices 110 and controls operation of the IoT ambiance platform 120 via the home network 140. The multimedia device 105 can be connected to receive the multimedia content from a content provider 180 over a wide area network (WAN) 170 through a connection to a subscriber network 150 (e.g., a local area network (LAN), a wireless local area network (WLAN), a personal area network (PAN), mobile network, high-speed wireless network, etc.). Each of the communication networks (i.e., 140, 160 and 170) can be configured to transmit and receive information over a combination of wired and wireless transmission protocols as desired. The multimedia device 150 can send user-requested content (i.e., video, data and/or voice services) to a variety of types of client devices 110, including but not limited to a television, computer, tablet, mobile device, other set-top boxes (STBs), and other devices as desired. While the multimedia device 150 and client devices 110 are shown in FIG. 1 as separate devices, it should be understood that the various components can be integrated into each other.

Figure 2:
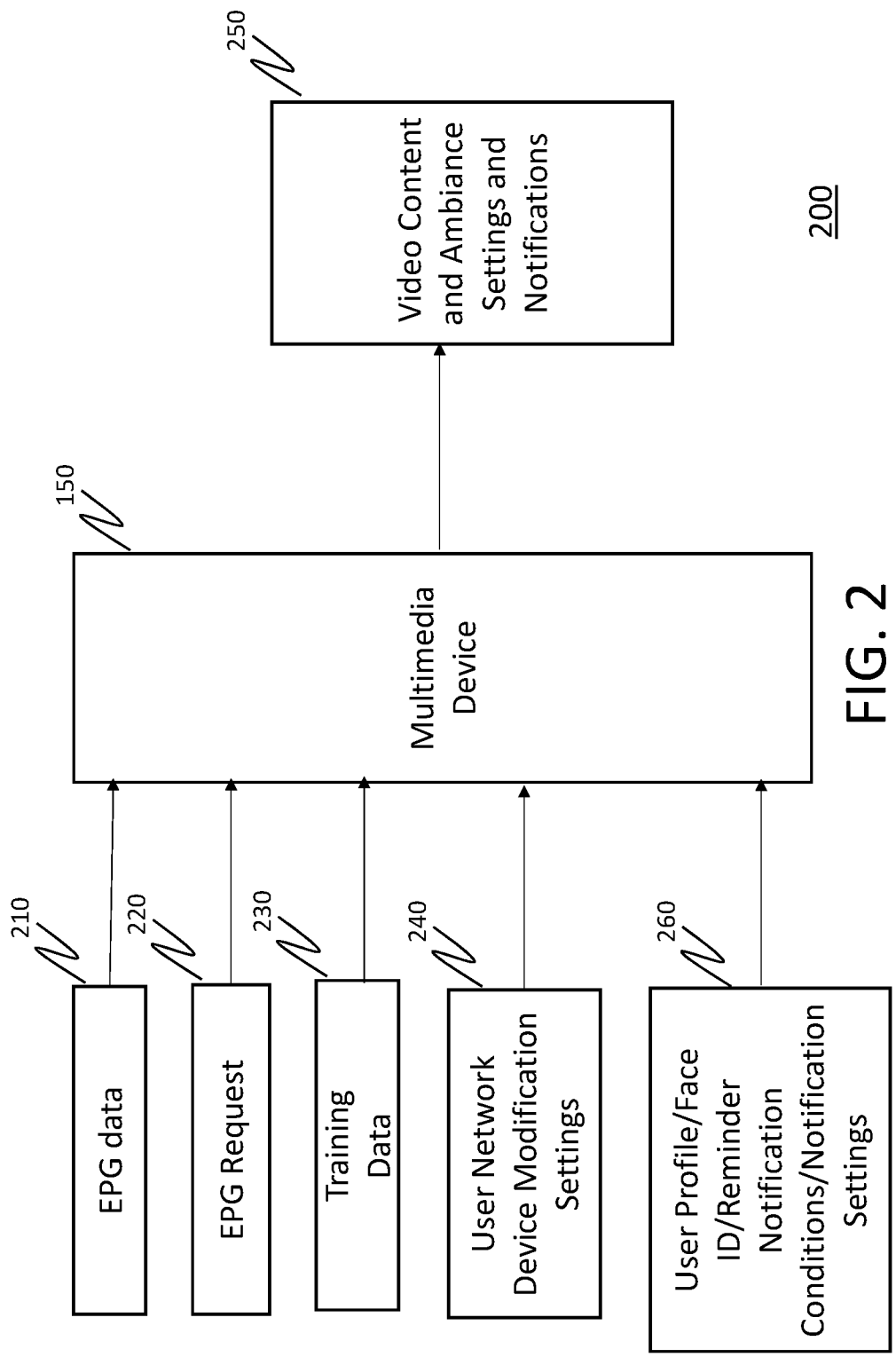
FIG. 2 illustrates an exemplary flow diagram for controlling ambiance based on user-requested content in accordance with an exemplary embodiment of the present disclosure.

FIG. 2 illustrates an exemplary data flow 200 for controlling ambiance based on user-requested content, controlling the enabling of display notifications, controlling reminder notifications, and controlling greeting notifications in accordance with exemplary embodiments of the present disclosure. According to an exemplary embodiment of the present disclosure, the multimedia device 150 can receive, electronic programming guide (EPG) data 210 from content provider 180 over networks 160 and 170 at periodic intervals. The electronic program guide data 210 can be communicated to the multimedia device 150 according to an Internet Protocol or Digital Video Broadcasting (DVB) protocol, or any other suitable communication protocol or standard as desired.

The electronic program guide data 210 may include information for broadcast content (i.e., programmed content) and video on-demand content (i.e., streaming content). The information for broadcast content may include a channel identifier (e.g., program channel "101" for ESPN content) associated with a content title ("Monday Night Football"), content type ("sports") and scheduled airing time ("7 pm EST"). The information for video on-demand content may include content categories (e.g., "on-demand", or "apps"), subcategories (e.g., subcategories for on-demand content may include "TV", "Movies", "Sports" etc. and subcategories for app content may include "Hulu", "Netflix" etc. Content titles may be provided for each program content under each category. Further, a content type is associated with each content title. The content type may include categories of sports, movie, news, tv series, etc. In embodiments, the content type may include advertisements. The content type may include other micro-level indications, such as, for example, drama, crime, comedy, etc.

Further, the multimedia device 150 can receive user content requests 220 (i.e., EPG request). Each content request may include a request for live content (i.e., programmed broadcast content) or stored content (i.e., on-demand, streamed content). The user content requests may be received via RCU 130 or any other user input device connected to the multimedia device 150 or integrated into the multimedia device 150. For example, in embodiments, the multimedia device 150 may have buttons located on its housing that a user may use to make channel requests.

Each user content request may include a program channel selection for broadcast content or a content title selection for video on-demand content. The multimedia device 150 may search the broadcast information in the electronic program guide data 210 for the channel selection and extract the corresponding content type associated with the user-selected channel identifier. Alternatively, for stored content (i.e., on-demand, streamed content), the multimedia device 150 may search the video on-demand content in the electronic program guide data for the content title and extract the corresponding content type associated with the content title.

The multimedia device 150 may receive data from IoT server 190. The received data may include training data which is to be used by multimedia device 150 to aid in the control of IoT ambiance platform 120. The training data may include data collected by IoT platform 120 (e.g., user operating settings selection) and data collected by multimedia device 150 (e.g., user-content requests), that have been preprocessed. Preprocessing of the data places the data in a format suitable for processing algorithms (e.g., machine learning algorithms). The data processing may be performed at a cloud server (e.g., IoT server 190) or the data processing may be performed at multimedia device 150. Preprocessing of the data (i.e., dataset) may include data formatting, data cleaning and feature extraction. Data formatting entails formatting data (i.e., heterogeneous data) in a same format. Data cleaning entails fixing missing data values and removing duplicates and unwanted data. Feature extraction entails identifying what data features of the dataset are pivotal for analytics.

It should be noted that while embodiments described herein describe the training data as data collected by the IoT ambiance platform 120 and multimedia device 150, the training data may include data (e.g., historical data) stored on IoT server 190 collected from other sources, such as, for example, other IoT systems associated with other users/ subscribers on the subscriber network, or other IoT devices/ systems connected to IoT server 190 or connected to wide area network 170 (i.e., the Internet). Since IoT devices worldwide are able to connect/communicate with one another over the Internet, data may be collected from any or all of the collected IoT devices.

Moreover, multimedia device 150 may receive user network device modification settings (i.e., user network device modification data) from a user IoT interface. The user network device modification settings are user changes to the ambiance settings for an IoT device in IoT ambiance platform 120. When a user makes a request for content, the multimedia device 150 retrieves the requested content from content provider 180 and the multimedia device 150 predicts the ambiance (i.e., user preferred settings for IoT platform 120) for the content based on the content type. Thereafter, the multimedia device 150 sends the content 250 to client device 110 and sends IoT ambiance platform settings 250 (i.e., ambiance settings) to IoT ambiance platform 120. The IoT ambiance platform settings will direct each IoT device's microcontroller to operate the corresponding IoT device in a manner consistent with the ambiance settings. The user may desire to operate one or more of the IoT devices in the IoT platform 120 in a manner different from the ambiance settings. As such, the user may send user network device modification settings 240 to multimedia device 150 to request changes to the ambiance setting(s) for one or more IoT devices in IoT ambiance platform 120. The multimedia device may collect and store the user network device modification settings for further processing. This data may be used by the multimedia device 150 to improve the predictions of the ambiance settings.

In embodiments, the multimedia device 150 can receive user profile data, at least one face_identifier, at least one reminder notification condition, and at least one notification setting 260 from at least one client device 110 for controlling the enabling of display notifications, controlling reminder notifications, and controlling greeting notifications in accordance with exemplary embodiments of the present disclosure. Moreover, the multimedia device 150 may output reminder notifications and salutation notifications 250 to a client device 110.

Figure 3:
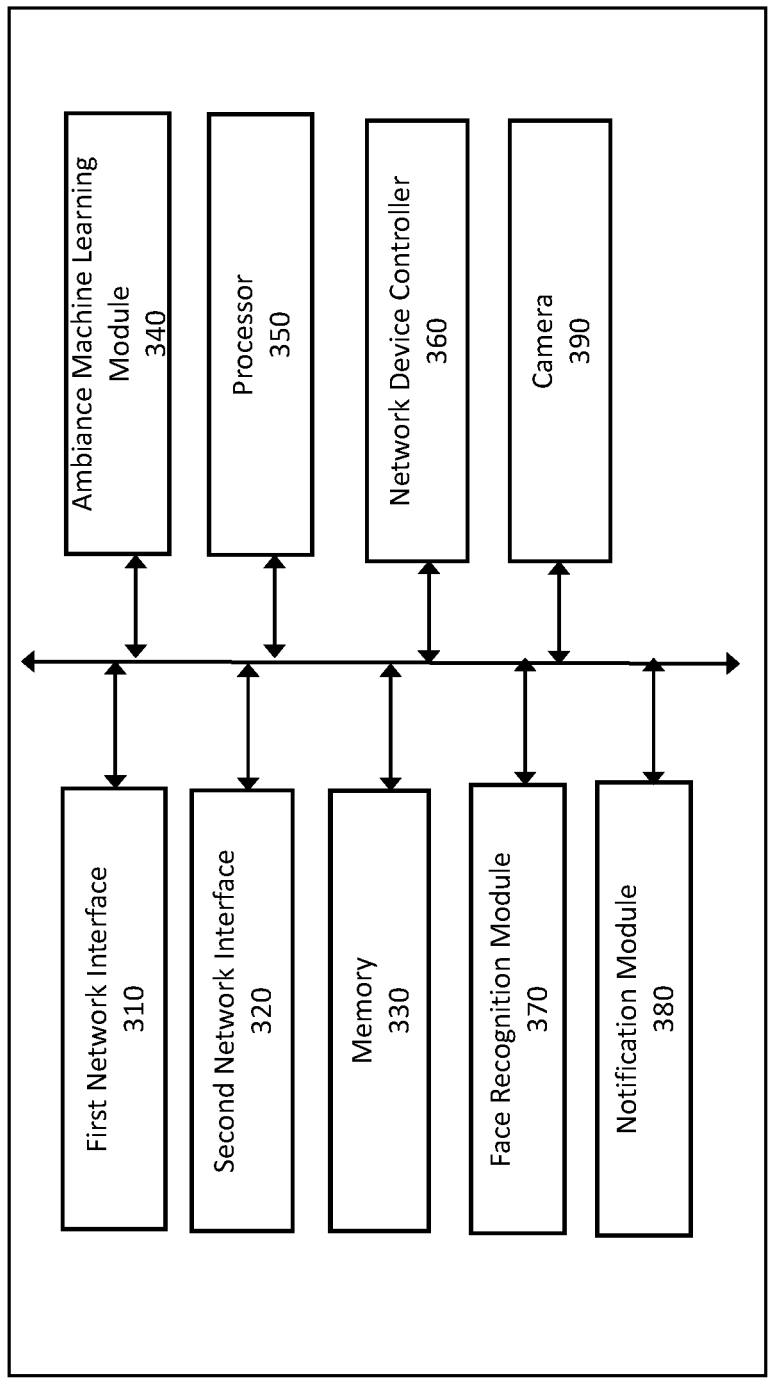
FIG. 3 is a block diagram illustrating an exemplary multimedia device operable to control ambiance based on user-requested content according to an exemplary embodiment of the present disclosure.

FIG. 3 is a block diagram illustrating an exemplary multimedia device 150 operable to control ambiance based on user-requested content, to control the enabling of display notifications, to control reminder notifications, and to control greeting notifications in accordance with exemplary embodiments of the present disclosure. The multimedia device 150 may include a first network interface 310, a second network interface 320, a memory 330, an ambiance machine learning module 340, a processor 350, a network device controller 360, a face recognition module 370, a notification module 380, a camera 390 and any other combination of hardware and software components as desired.

The first network interface 310 (i.e., interface to networks 160, 170) can be configured to receive video content and electronic programming guide data from a content provider 180 over the networks 160, 170. The first network interface 310 may include one or more tuners, wherein each of the one or more tuners may be tuned to a channel to receive content carried over the channel for live content. Each tuner may be tuned to a frequency that is associated with a certain channel, and the frequency to which each tuner is tuned may be controlled by requests received from a user input device to the multimedia device 150 or requests received from one or more client devices 110. In embodiments, a user request can cause the network interface 310 to reserve a tuner for a period of time during which the tuner is to be tuned to a channel specified in the user request (e.g., where a user schedules a program to be recorded at the multimedia device 105 or an associated client device 110).

The first network interface 310 receives the content requested by the user. The content retrieved for live content may be received from a designated channel. The content retrieved for stored content may be received in an IP packet stream. It should be understood that the first network interface 310 may include any interface configured to receive one or more services (e.g., data, video content, etc.) delivered to the multimedia device 150 as a signal or communication from content provider 180. Moreover, the first network interface can be configured to receive training data 230 from IoT server 190 over networks 160 and 170. As such, the first network interface may include any interface configuration to receive data delivered to multimedia device 150 from IoT server 190.

The second network interface 320 (i.e., interface to network 140) can be configured to send and receive data to/from client device(s) 110, IoT platform 120 and RCU 130 over home network 140. The second network interface can receive user content requests 220 and output the requested content 250 to client device(s) 110. It should be understood that the second network interface 320 may include any interface configured to deliver content to client device(s) 110. In embodiments, second network interface may include hardware/software that provides communications over home network, such as, for example, Wi-Fi, Zigbee, Bluetooth, Ethernet, Multimedia over Coax Alliance (MoCA), RF, etc. Content received at the multimedia device 150 may be output to one or more client devices 110 for display through the second network interface 320.

Moreover, in embodiments, the second network interface 320 can be configured to send/receive notifications to/from a client device 110. The notifications can include display notifications, reminder notifications, salutation notifications, etc. The notifications can be sent/received using one or more communication protocols, including but not limited to, instant messaging, Short Message Service (SMS), email, push notifications, in-app messages and voice response system.

In embodiments, the multimedia device 150 can be configured to deliver video content signals using IP multicast information. The multimedia device 150 and any companion devices as desired may include devices that facilitate a switched digital video, broadcast video (over-the-air or cable), and/or real-time feeds. The multimedia device 150 can output content to client device 110, such as a display device over a wireless or wired RF link, such as a coaxial cable. According to an exemplary embodiment, the multimedia device 150 may deliver content over a composite video link, a component video link, a digital video link, a high-definition multimedia interface (HDMI), a wireless link or other type of known video link, video transmission standard or protocol as desired.

The memory 330 (e.g., random access memory (RAM), non-volatile secondary storage, hard drive, a floppy drive, and a CD-ROM drive) may store electronic program guide (EPG) data 210, user requested video content 250, user network device modification settings 240, ambiance settings 250, IoT platform settings 250, training data 230, electronic program request 220 (i.e., user content requests), user input data, data collected by IoT platform 120, electronic program guide business rules, ambiance machine learning module business logic rules, ambiance machine learning module data, face recognition module business logic rules, face recognition module data, notification module business logic rules, notification module data, a user profile database, a notification database, audio data, computer executable instructions (e.g., ambiance machine learning module computer executable instructions, face recognition computer executable instructions, notification module computer executable instructions), and/or information that maps requests or control signals generated by the RCU 130 to a specified action or function.

The processor 350 can be configured to control the operation of the multimedia device 150. As such, the processor 350 processes ambiance machine learning module executable instructions (i.e., ambiance machine learning module 340) to predict ambiance settings based on user requested content. The processor 350 can be configured to execute the ambiance machine learning module computer executable instructions to perform analytics on the received training data using at least one machine learning algorithm to create a model to predict ambiance settings; predict ambiance settings for a content type using the model; evaluate accuracy of the model based on the one or more user network device modified settings; and perform optimizations to the model depending upon the evaluated accuracy to improve the predictions of the ambiance settings.

The processor 350 can be configured to control the network device controller 360 to ascertain a content type for a user content request using the electronic program guide data and the electronic program guide business rules and to control the operating settings of one or more IoT devices (i.e., network devices) based on the predicted ambiance settings.

The processor 350 can be configured to process face recognition module computer executable instructions (e.g., a face recognition module 370) to generate a face_identifier for a user/viewer by extracting the required data from the data captured by camera 390 to determine the face_identifier of the viewer using at least one facial recognition algorithm. In embodiments, the processor 350 can be configured to process face recognition module computer executable instructions (e.g., the face recognition module 370) to detect the presence of a viewer by analyzing the data captured by a camera 390 using a machine learning algorithm.

Further, the processor 350 can be configured to process notification module computer executable instructions (e.g., a notification module 380) to create a user profile; to map a user face_identifier to a client device in user profile database; to determine whether the multimedia device 150 received a notification for display from a client device; to capture data from live feed of the camera 390; to receive a presence detection indication; to receive a determined face_identifier; to check whether the determined face_identifier of the viewer matches a registered face_identifier for a registered user, to display the received notification if a match is established, and to otherwise suppress the display of the notification if a match is not established.

In embodiments, the processor 350 can be configured to process notification module computer executable instructions (e.g., a notification module 380) to create a user profile; to map a user face_identifier to a client device in the user profile database; to receive at least one reminder notification condition; to capture data from live feed of the camera 390; to receive a determined face_identifier; to map the at least one reminder condition to the determined face_identifier in the notification database; to determine whether a reminder notification condition occurred; to extract a corresponding face_identifier for the reminder notification condition from the notification database and check whether the corresponding face_identifier matches a registered face_identifier for a registered user in the user profile database; and to forward the reminder notification to the client device mapped to the matching registered face_identifier.

In embodiments, the notification module 380 may rely on electronic program guide data 210 when determining whether a reminder notification condition is true.

In embodiments, the processor 350 can be configured to process notification module computer executable instructions (e.g., the notification module 380) to create a user profile; to receive at least one greeting notification setting; to map a user face_identifier to the at least one greeting notification setting in the user profile database; to determine whether a user is attempting to power off/put in stand-by mode or power on/put in the wake up mode multimedia device 150; to capture data from live feed of the camera 390; to receive a determined face_identifier; to search the user profile database for the determined face_identifier and extract the greeting notification settings mapped to the face_identifier; to display the corresponding salutation along with the name or nick name of the user mapped to the face_identifier on the display screen of the multimedia device while also causing the utterance of the corresponding salutation.

Figure 4A:
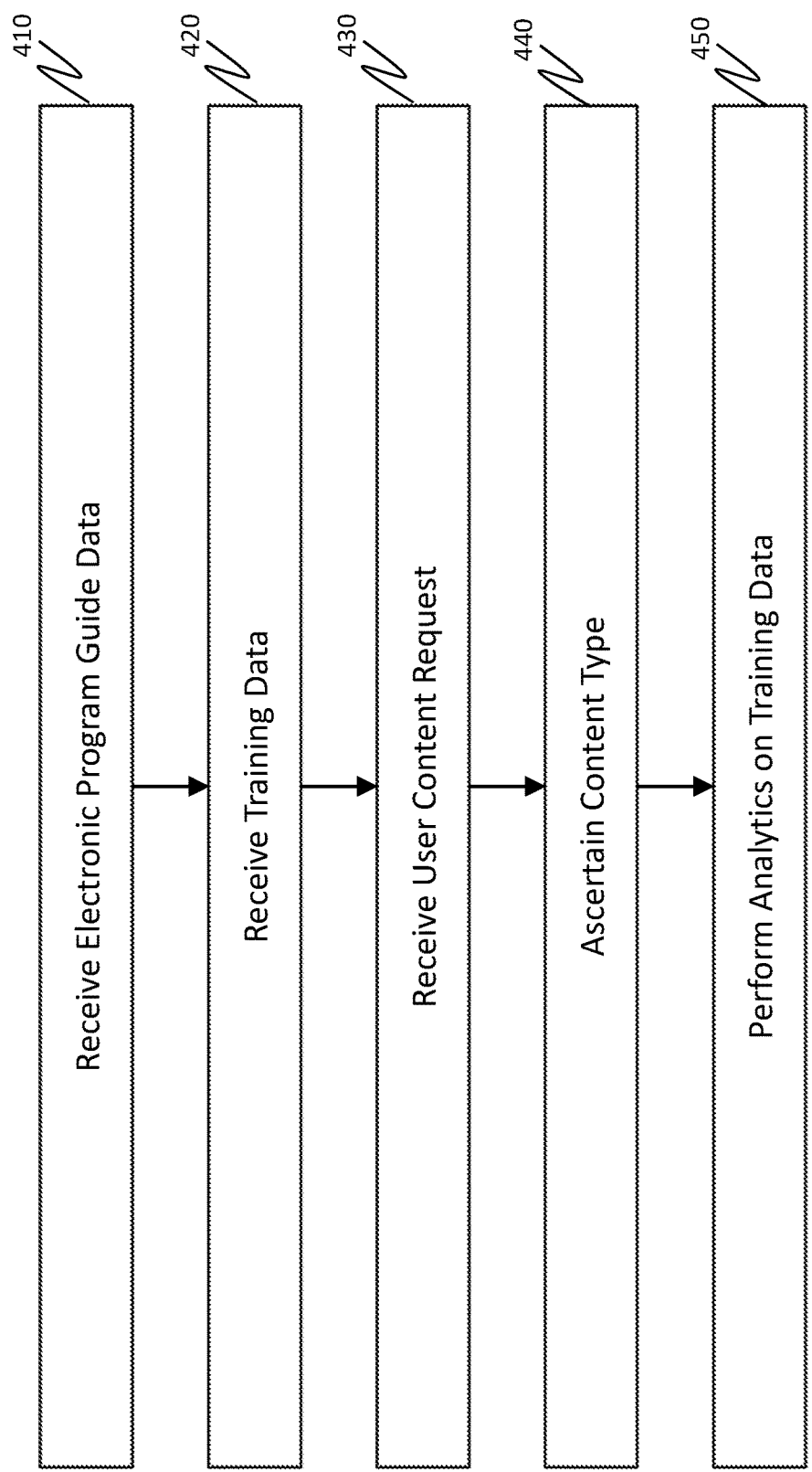
FIGS. 4A-4B illustrate a method for controlling ambiance based on user-requested content in accordance with an exemplary embodiment of the present disclosure.
Figure 4B:
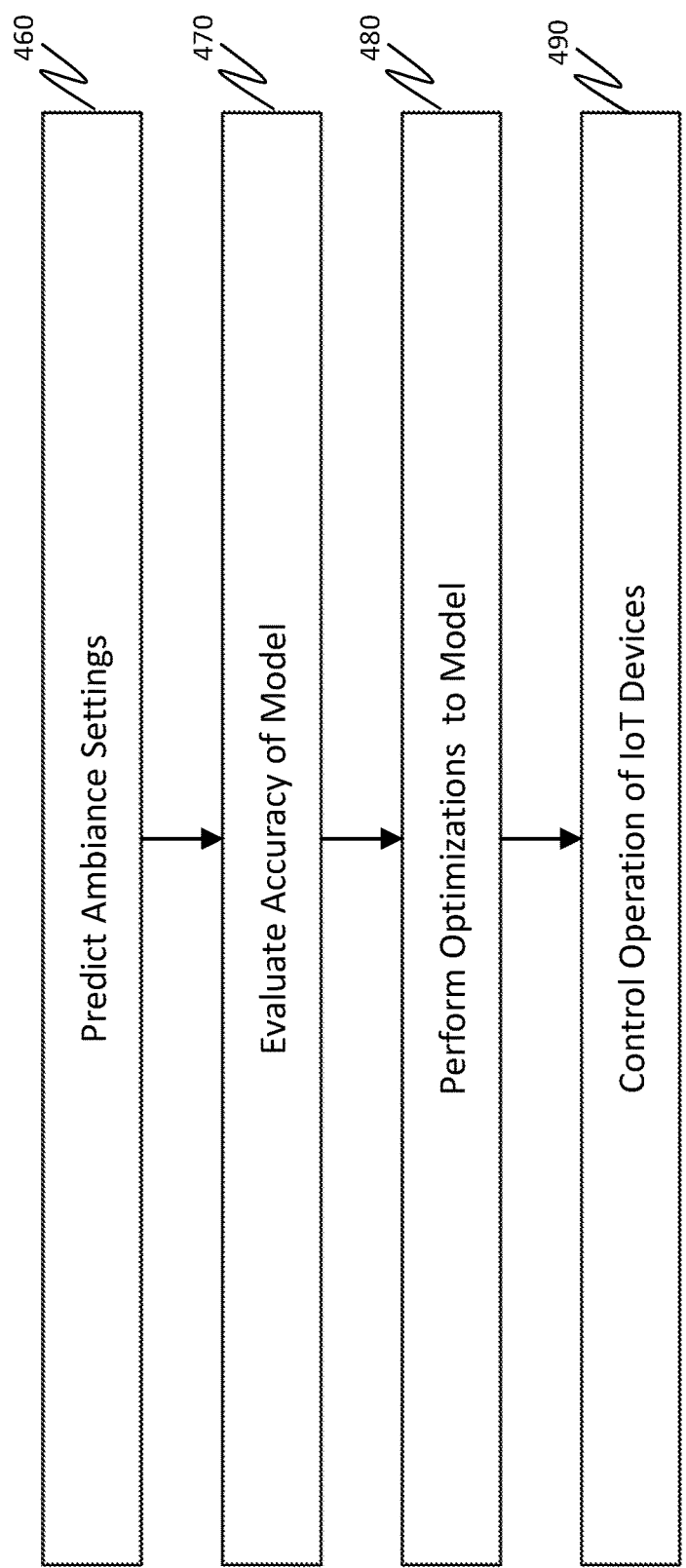

FIGS. 4A-4B illustrate a method 400 for controlling ambiance based on user-requested content in accordance with an exemplary embodiment of the present disclosure.

At steps 410-420, multimedia device 150 may receive electronic program guide data from content provider 180 and training data from IoT server 190 respectively. At step 430, multimedia device 150 may receive at least one user content request 220 and user network device modification settings 240 (i.e., user network device modification data). At step 440, multimedia device may ascertain a content type for a user content request using the electronic program guide data. When a user content request is received, the multimedia device 150 may wait a predetermined time period (e.g., one minute, five minutes, etc.) before ascertaining the content type. If no other user content request is received within the predetermined time period, the multimedia device may proceed with ascertaining the content type for the user content request.

At step 450, multimedia device may perform analytics on the received training data using at least one machine learning algorithm to create a model to predict ambiance settings. The machine learning algorithm identifies natural patterns in the data (i.e., training). As noted, the training data may include IoT device settings and user content requests (i.e., program channel or content title). The data may be preprocessed when generating the training data. The preprocessing may include correlating data (e.g., IoT device settings and user content requests) generated around a same time frame together based on the time stamp(s) of the data. Moreover, each user content request may be associated with a content type. Each program channel and content title is associated with a corresponding content type which is included in the electronic program guide data. The machine learning algorithm may perform analytics on the training data to identify (i.e., learn) patterns between the IoT device settings and the requested content/content type (e.g., preferred IoT device settings for a particular content type). Further, the machine learning algorithm may create a model to predict ambiance settings. The patterns may be identified using a supervised learning algorithm, unsupervised learning algorithm, semi-supervised learning algorithm, or reinforcement learning algorithm. The identified pattern(s) may be represented as a mathematical model which is configured to predict ambiance settings for a given content type. The model may embody a set of statistical assumptions concerning the training data.

At step 460, the multimedia device 150 may predict ambiance settings for a received user content request data (e.g., user content request/content type) using the created model. At step 470, the multimedia device may evaluate the accuracy of the model by comparing the user network device modification settings (i.e., user network device modification data) and the predicted ambiance settings. As noted, user network device modification settings are user changes to predicted IoT device settings. At step 480, the multimedia device may perform optimizations to the model based on the accuracy evaluation. If the accuracy of the ambiance prediction(s) is low (e.g., below a predetermined threshold) then the multimedia device may perform optimizations. The optimizations may include using the user network device modification settings to learn (i.e., re-learn) patterns in the data using a machine learning algorithm. Thereafter, the multimedia device creates a new model to predict ambiance settings. In embodiments, the multimedia device iteratively performs optimizations to the model as new user device modification data is received.

At step 490, the multimedia device 150 may control the operations of IoT devices (i.e., network devices) in a manner consistent with the ambiance settings.

Figure 5:
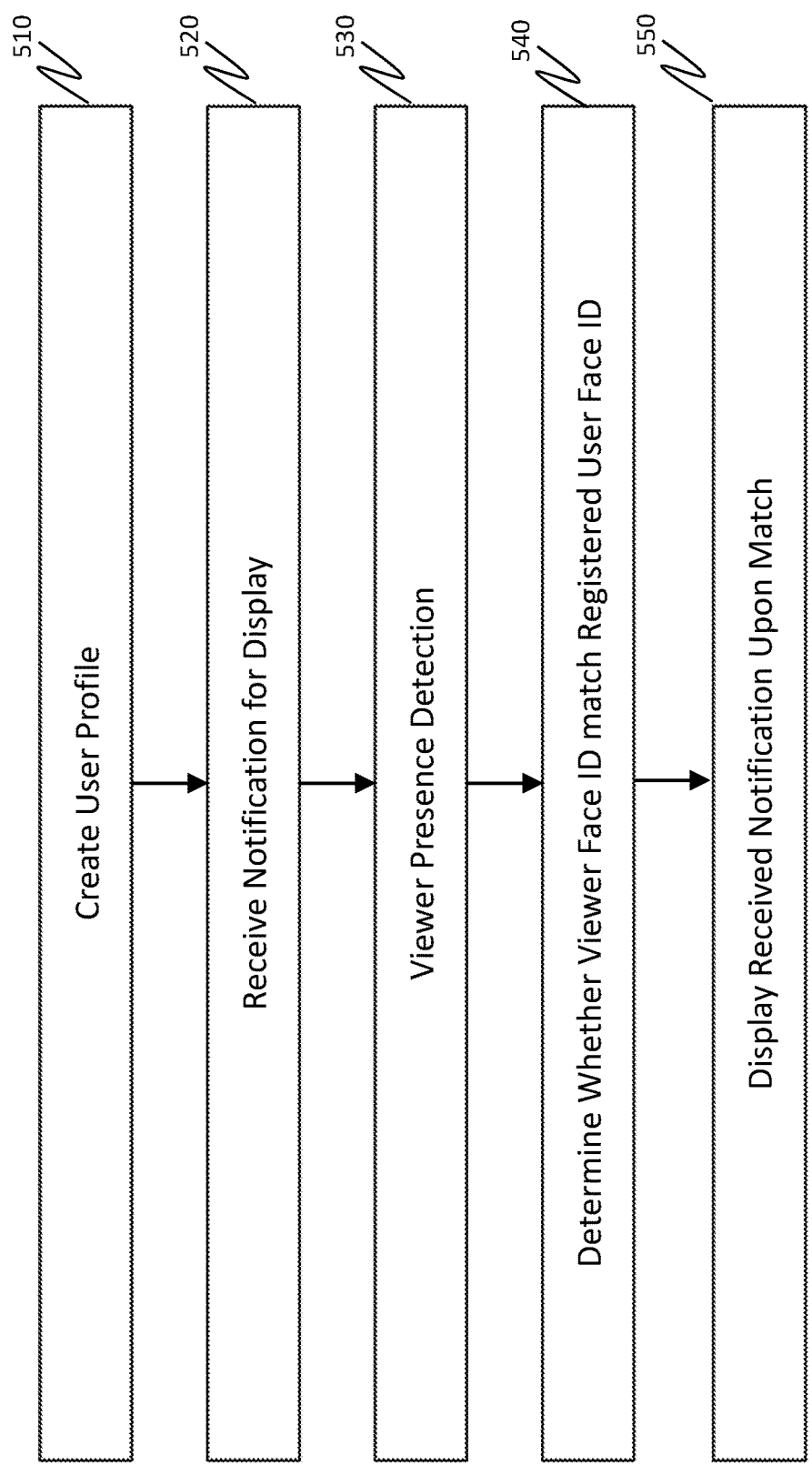
FIG. 5 illustrates a method for controlling the display of notifications in accordance with an exemplary embodiment of the present disclosure.

FIG. 5 illustrates a method 500 for enabling display of notifications in accordance with an exemplary embodiment of the present disclosure.

At step 510, the multimedia device 150 creates a user profile for a user desiring to enable display notifications while watching content from the multimedia device 150. At initial setup, the multimedia device 150 can register the user and a corresponding notification sending client device 110 in the user profile database. The notification sending client device is the specific device, for example, a mobile device, from which notifications will be shared with multimedia device 150 for display when the user (i.e., the operator of the notification sending client device) is watching content on another device. The registration can include creating a user profile entry for the user in the user profile database stored in memory 330. The entry may establish a mapping between the user and the corresponding notification sending client device 110 (e.g., mobile device) using the user's face as an identifier (ID) for the user (e.g., a face_identifier generated by the mobile device) and a mobile device ID (e.g., MAC, IMEI, serial number, etc.). In embodiments, the user profile entry may include at least one notification setting (e.g., enable display of mobile notifications only when user's presence is detected).

At step 520, a notification is received by multimedia device 150 from a notification sending client device. The notification will only be displayed on the screen (e.g., the screen of multimedia device) if the user's presence is detected (i.e., which is an indication that the user is viewing content from multimedia device 150) and the user's identification is verified. In embodiments, the multimedia device will only display the notification if the user's profile includes a notification setting enabling the feature of displaying notifications only when the viewer is watching content. It should be noted that the notifications may be displayed on other devices, such as, for example, a television, tablet, etc.

At step 530, the multimedia device 150 detects the presence of a viewer using face recognition module 370 and camera 390. So, for example, when a viewer is presented in front of the multimedia device 150 (e.g., the viewer may sit in front of the multimedia device to watch content on client device 110), the live feed of camera 390 will capture the visual data of the viewer. The captured data will be analyzed using face recognition machine learning module 370 to determine whether the captured data represents a viewer. Once it is determined that the captured data is a viewer (i.e., person), the multimedia device 150 determines the face_identifier of the viewer using the captured data and face recognition module 370. The face recognition module 370 is able to extract the required data from the captured data to determine the face_identifier of the viewer.

At step 540, the multimedia device 150 checks whether the determined face_identifier of the viewer matches a registered face_identifier for a registered user, which is mapped to a notification sending client device 110 (e.g., mobile device), in the user profile database. At step 550, if a match is established, then the received notification will be displayed on the screen; otherwise, if a match is not established, then the received notification will not be displayed.

Figure 6:
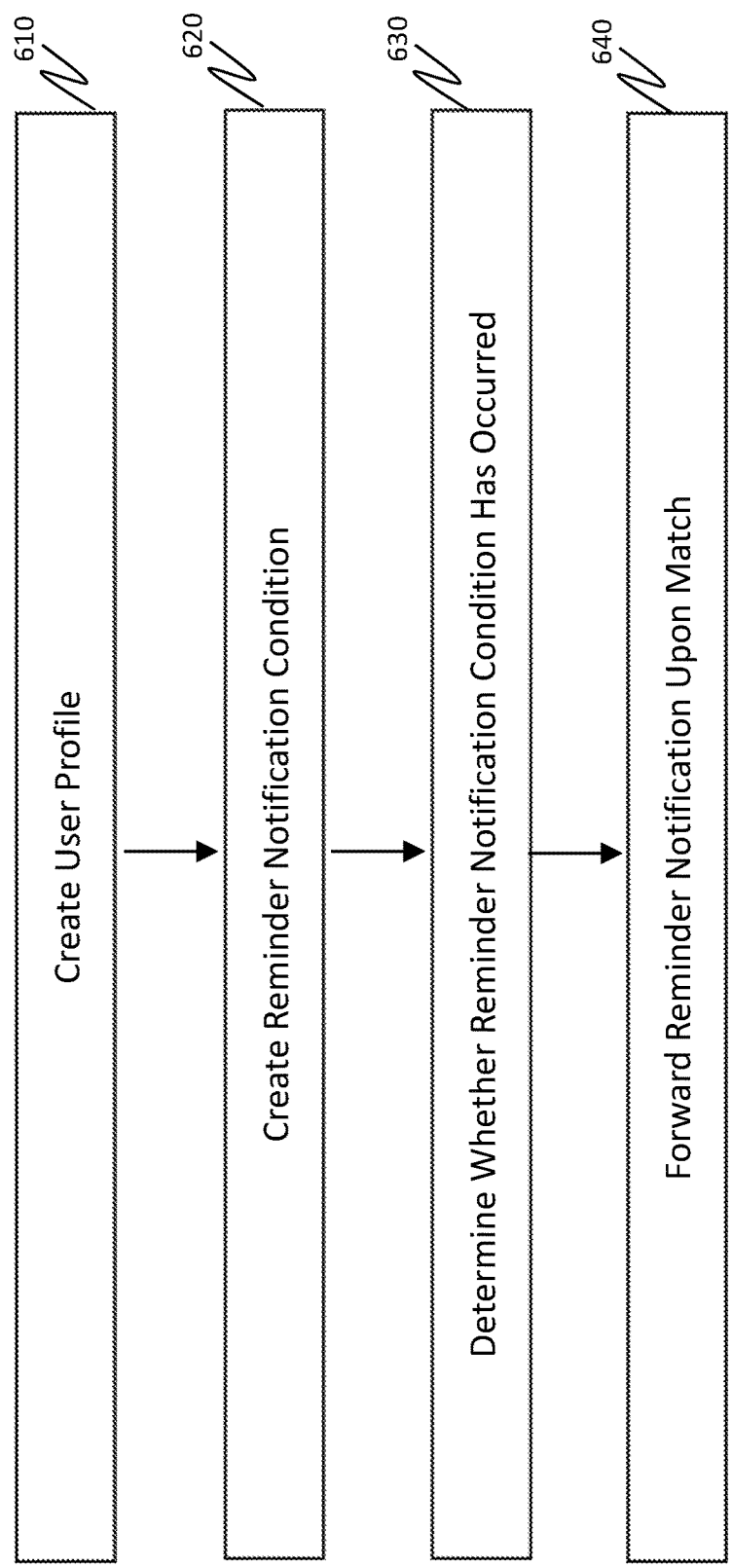
FIG. 6 illustrates a method for controlling reminder notifications in accordance with an exemplary embodiment of the present disclosure.

FIG. 6 illustrates a method 600 for controlling reminder notifications in accordance with an exemplary embodiment of the present disclosure.

At step 610, the multimedia device 150 creates a user profile for a user desiring to set up reminder notifications by the multimedia device for display on a client device (e.g., mobile device). At initial setup, the multimedia device 150 can register the user and a corresponding notification receiving client device 110 in the user profile database. The notification receiving client device is the specific device, for example, a mobile device, to which reminder notifications will be sent from multimedia device 150 for display thereon. The registration can include creating a user profile entry for the user in the user profile database. The entry may establish a mapping between the user and the corresponding notification receiving client device 110 (e.g., mobile device) using the user's face as an identifier (ID) for the user (e.g., a face_identifier generated by the mobile device) and a mobile device ID (e.g., MAC, IMEI, serial number, etc.).

At step 620, the user can set up at least one condition (i.e., creates an event) for triggering a reminder notification. For example, the user may set up to receive a reminder notification when particular content (e.g., a live program, "Monday Night Football") is scheduled to air. The reminder notification may indicate a timing for receiving the notification (e.g., ten minutes prior to the broadcast start time for the particular content). The reminder notification conditions are stored in notification database in memory 330 along with a corresponding face_identifier of the user creating the condition(s). The corresponding face_identifier can be generated by multimedia device 150 using face recognition module 370 and camera 390. As noted, the live feed of camera 390 will capture the visual data of the user setting up the reminder notification conditions. The captured data will be analyzed using face recognition module 370 to determine the face_identifier of the user. Moreover, depending on the condition(s) set by the user for the reminder notification(s), the multimedia device 150 can extract any notification receiving client device details needed to effectuate processing of the condition and/or transmission of the reminder notification(s). The extracted details can be mapped to the reminder notification condition(s) stored in notification database along with the face_identifier generated by multimedia device 150.

At step 630, notification module 380 determines that a reminder notification condition has occurred. (i.e., the condition is true). Thereafter, multimedia device 150 may extract the corresponding face_identifier for the reminder notification condition from the notification database and check whether the corresponding face_identifier matches a registered face_identifier (which is mapped to a corresponding notification receiving client device 110) for a registered user in the user profile database. At step 640, if a match is established, then the reminder notification will be forwarded to the notification receiving client device 110. The reminder notification can be sent as a push notification, text message, chat, email or any other messaging/communication protocol.

Figure 7:
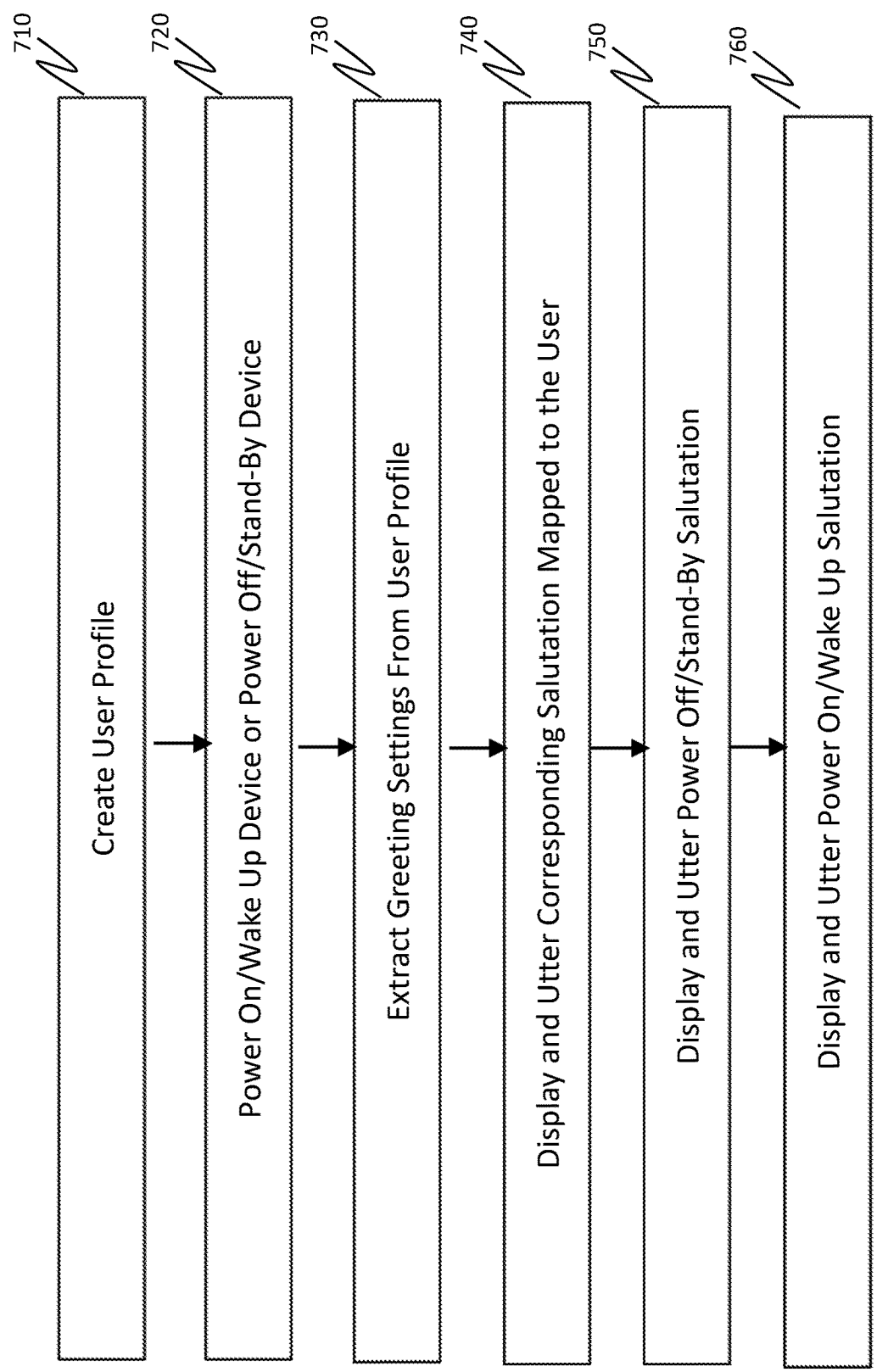
FIG. 7 illustrates a method for controlling greeting notifications in accordance with an exemplary embodiment of the present disclosure.

FIG. 7 illustrates a method 700 for controlling greeting notifications in accordance with an exemplary embodiment of the present disclosure.

At step 710, the multimedia device 150 creates a user profile. The user profile may include the user's name and/or nick name. At initial setup, the multimedia device 150 can register a user and any corresponding greeting notification settings (e.g., salutations that are uttered/spoken when the multimedia device 150 is turned on and turned off by the user and the user's name/nick name) in the user profile database. The registration can include creating a user profile entry for the user in the user profile database. The entry may establish a mapping between the user and any corresponding greeting notification settings, such as, for example, "Welcome user's name or nick name" when the multimedia device is powered on (or put in wake up mode) and "Goodbye user's name or nick name" when the multimedia device is powered off (or put in stand-by mode), using the user's face as an identifier (face_identifier). In embodiments, the multimedia device 150 may include a speech synthesizer module and speaker unit for outputting artificial production of human speech when providing the greeting notification settings (i.e., the salutations) when the multimedia device 150 is turned on/put in wake up mode and turned off/put in stand-by mode by the user.

At step 720, when the user tries to put the multimedia device 150 in stand-by mode (or power off) or wake up mode (or power on), the multimedia device 150 may capture the image of the user using camera 390 and generate a face_identifier for the user using face recognition module 370. The multimedia device 150 may detect that the user is trying to put the multimedia device 150 in stand-by mode (or power off) or wake up mode (or power on) based upon one or more received inputs, such as, for example, a power off signal or a power on signal received from RCU 130 or client device 110 or from a user interface on the multimedia device 150 (i.e., buttons integrated on the housing of the multimedia device). At step 730, the multimedia device will search the user profile database for the face_identifier and extract the greeting notification settings mapped to the face_identifier. At step 740, the multimedia device may display the corresponding salutation along with the name or nick name of the user mapped to the face_identifier on the display screen of the multimedia device while also uttering the corresponding salutation. In embodiments, the multimedia device 150 may include a speech synthesizer module and speaker unit for outputting artificial production of human speech when providing (i.e., uttering) the salutations when the multimedia device 150 is turned on and turned off by the user.

So, when the user sends the multimedia device 150 to stand-by mode at step 750, the multimedia device captures an image of the user, generates a face_identifier for the user, extracts the corresponding greeting notification settings from the user profile database and displays the message "Good Bye user name or nick name" while also uttering the message. Alternatively, when the user wakes up or powers on the multimedia device at step 760, the multimedia device captures an image of the user, generates a face_identifier for the user, extracts the corresponding greeting notification settings from the user profile database and displays the message "Welcome user name or nick name" while also uttering the message.

Figure 8:
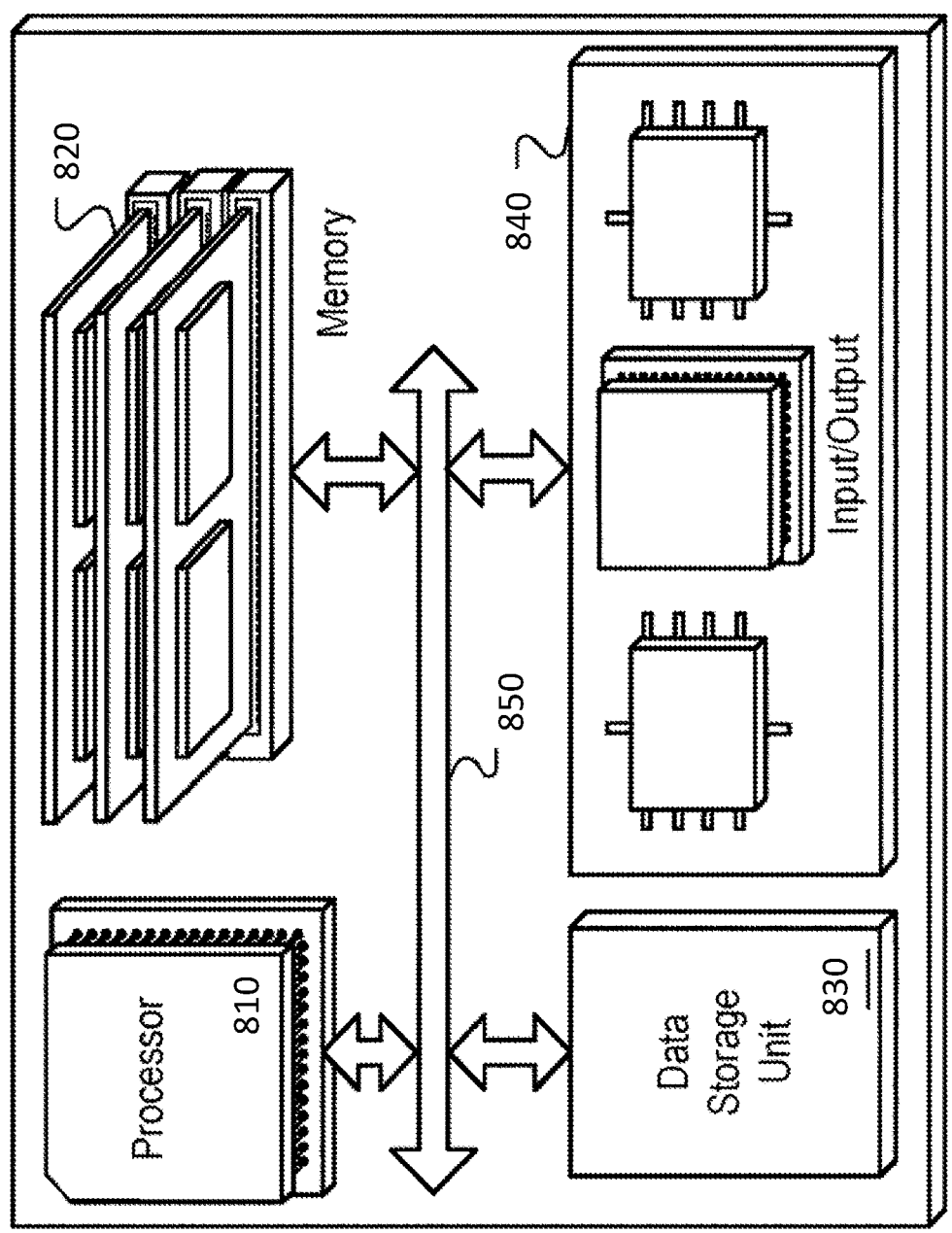
FIG. 8 is a block diagram of a hardware configuration operable to facilitate the control of ambiance based on user-requested content in accordance with an exemplary embodiment of the present disclosure.

FIG. 8 is a block diagram of a hardware configuration 800 operable to facilitate the control of ambiance based on user-requested content, the control of enabling display notifications, the control of reminder notifications, and the control of greeting notifications in accordance with an exemplary embodiment in accordance with an exemplary embodiment in accordance with exemplary embodiments of the present disclosure. The hardware configuration 800 can include a processor 810, a memory 820, a storage device 830, and an input/output device 840. Each of the components 810, 820, 830, and 840 can, for example, be interconnected using a system bus 850. The processor 810 can be capable of processing instructions for execution within the hardware configuration 800. In one implementation, the processor 810 can be a single-threaded processor. In another implementation, the processor 810 can be a multi-threaded processor. The processor 810 can be capable of processing instructions stored in the memory 820 or on the storage device 830.

The memory 820 can store information within the hardware configuration 800. In one implementation, the memory 820 can be a computer-readable medium. In one implementation, the memory 820 can be a volatile memory unit. In another implementation, the memory 820 can be a non-volatile memory unit.

In some implementations, the storage device 830 can be capable of providing mass storage for the hardware configuration 800. In one implementation, the storage device 830 can be a computer-readable medium. In various different implementations, the storage device 830 can, for example, include a hard disk device, an optical disk device, flash memory or some other large capacity storage device. In other implementations, the storage device 830 can be a device external to the hardware configuration 800.

The input/output device 840 provides input/output operations for the hardware configuration 800. In embodiments, the input/output device 840 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, etc.). In embodiments, the input/output device can include driver devices configured to send communications to, and receive communications from one or more networks (e.g., subscriber network 160 of FIG. 1, WAN 170 of FIG. 1, home network 140 of FIG. 1, etc.).

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. In some embodiments, an apparatus or device embodying the present disclosure may be in the form of a gateway, an access point, a set-top box or other standalone device, or may be incorporated in a television or other content playing apparatus, or other device, and the scope of the present disclosure is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any disclosure or of what may be claimed, but rather as descriptions of features that may be specific to particular embodiments of particular disclosures.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the present disclosure in detail, it will be understood that such detail need not be strictly adhered to, but that additional changes and modifications may suggest themselves to one skilled in the art.

What is claimed is:

1. A method for controlling ambiance based on user-requested content, the method comprising:
receiving, from a content server, electronic program guide data over a first network;
receiving, from an internet of things (IoT) server, training data over the first network, the training data including user operating settings and past user content requests;
generating a trained model to predict one or more ambiance settings for one or more network devices during playback of user requested content, the trained model generated by performing analytics on the received training data using at least one machine learning algorithm;
receiving, from a user input device, at least one new user content request over a second network;
ascertaining, at a pre-determined time after the at least one new user content request is received, a content type for the at least one new user content request using the electronic program guide data;
predicting one or more ambiance settings for the one or more network devices based on the content type using the trained model; and
controlling operation of the one or more network devices consistent with the predicted one or more ambiance settings.

2. The method of claim 1, further comprising:
receiving, from the IoT server, user network device modification data;
evaluating accuracy of the trained model based on the user network device modification data, wherein the evaluating the accuracy of the trained model includes:
comparing the user network device modification data and the predicted one or more ambiance settings; and
performing optimizations to the model based on the evaluated accuracy to improve the predictions of the one or more ambiance settings.

3. The method of claim 2, wherein the analytics performed on the training data includes identifying patterns from the training data to create the trained model.

4. The method of claim 3, wherein the optimizations performed include modifying the identified patterns using the user network device modification data to create a new trained model.

5. The method of claim 2, further comprising performing optimizations iteratively as new user network device modification data is received.

6. The method of claim 1, wherein the electronic program guide data includes a content type for a corresponding content title.

7. The method of claim 1, wherein the one or more ambiance settings correspond to user preferred settings for one or more network devices while viewing a particular content type.

8. The method of claim 1, wherein the content type comprises a category selected from sports, movies, and news.

9. The method of claim 1, wherein the one or more network devices are internet of things (IoT) devices.

10. A device for controlling ambiance based on user-requested content, the device comprising:
- a first network interface configured to receive electronic program guide data and training data, the training data including user operating settings and past user content requests;
- a memory configured to store the electronic program guide data and computer executable instructions;
- a processor configured to generate a trained model to predict one or more ambiance settings for one or more network devices during playback of user requested content, the trained model generated by performing analytics on the received training data using at least one machine learning algorithm;
- a second network interface configured to receive at least one new user content request; and
- a network device controller configured to ascertain, at a pre-determined time after the at least one new user content request is received, a content type for the at least one new user content request using the electronic program guide data;
- the processor further configured to predict one or more ambiance settings for the one or more network devices based on the content type using the trained model; and
- the network device controller further configured to control operation of the one or more network devices consistent with the predicted one or more ambiance settings.

11. The device of claim 10, wherein the processor is further configured to:
- receive user network device modification data;
- evaluate accuracy of the trained model based on the user network device modified data, wherein the evaluating the accuracy of the trained model includes:
  - comparing the user network device modification data and the predicted one or more ambiance settings and
- perform optimizations to the trained model based on the evaluated accuracy to improve the predictions of the one or more ambiance settings.

12. The device of claim 11, wherein the analytics performed on the training data by the processor includes identifying patterns from the training data to create the trained model.

13. The device of claim 12, wherein the optimizations performed by the processor include modifying the identified patterns using the user network device modification data to create a new model.

14. The device of claim 11, wherein the processor is further configured to perform optimizations iteratively as new user network device modification data is received.

15. The device of claim 10, wherein the electronic program guide data includes a content type for a corresponding content title.

16. The device of claim 10, wherein the one or more ambiance settings correspond to user preferred settings for one or more network devices while viewing a particular content type.

17. The device of claim 10, wherein the content type comprises a category selected from sports, movies, and news.

18. The device of claim 10, wherein the one or more network devices are internet of things (IoT) devices.

* * * * *